350-1.1

XR 3,810,777

T 3010N

United States Patent Office 3,810,777
Patented May 14, 1974

1 2

3,810,777

COATINGS HAVING HIGH SOLAR ABSORPTANCE TO INFRARED EMITTANCE RATIOS

Carl P. Boebel, Akron, and Gary E. Stevenson, Xenia, Ohio, assignors to the United States of America as represented by the Secretary of the United States Air Force No Drawing. Continuation-in-part of abandoned application Ser. No. 28,138, Apr. 13, 1970. This application Mar. 23, 1972, Ser. No. 237,494
The portion of the term of the patent subsequent to Apr. 4, 1989, has been disclaimed
Int. Cl. B44d 5/06; G02b 5/20
U.S. Cl. 117—33.3 3 Claims

ABSTRACT OF THE DISCLOSURE

A formulation providing coatings having high solar absorptance to infrared emittance ratios comprises oxidized copper flakes, a polymeric binder and a solvent for the binder. The oxidized copper flakes may be prepared by heating in an oxygen containing atmosphere prior to the inclusion in the coating formulation. Optionally, copper flakes may be dispersed in the coating formulation followed by applying the formulation to the substrate to be coated followed by curing of the polymeric binder. Then the copper flakes embedded in the binder may be oxidized by heating the coated substrate in an oxygen containing atmosphere. The formulation is particularly useful for coating surfaces of missile and spacecraft structures where thermal balance is of prime importance. In general, the coated surfaces have a solar absorptance to infrared emittance ratio ranging from 1.80 to 2.60.

This application is a continuation-in-part of pending U.S. patent application Ser. No. 28,138, filed on Apr. 13, 1970, and now abandoned.

This invention relates to coating compositions having high solar absorptance to infrared emittance ratios. In one aspect it relates to compositions that are particularly adapted for coating surfaces of missile and spacecraft structures. In another aspect it relates to a process for coating substrates, such as surfaces of missiles and spacecraft structures, in order to control thermal balance.

Successful thermal balance of a spacecraft depends in part upon the optical properties of the surface coatings and the behavior of these properties in the space environment. The thermophysical properties that are of interest to thermal designers are (1) solar absorptance ($\alpha_S$), the fraction of incident solar energy which a surface absorbs, and (2) the infrared emittance ($\epsilon_{IR}$), the fraction of heat that a surface radiates compared to that which a blackbody would radiate at the same temperature.

One type of thermal control material available to spacecraft designers is called the solar absorber surface. Such surfaces absorb solar energy ($\alpha_S>0.4$) while emitting only a small percentage of the infrared energy ($\epsilon_{IR}<0.25$). Thus, their $\alpha_S/\epsilon_{IR}$ ratios are greater than unity which makes it possible to maintain surfaces at high temperatures while the craft is traveling through space. This is of great importance since it is necessary to maintain certain types of equipment associated with a spacecraft at a high temperature in order to ensure satisfactory operation.

In the past, solar absorber surfaces have been obtained by the use of polished metals, chemical conversion coatings, and thin film techniques, such as vacuum evaporation, sputtering, electron beam, and thermal decomposition of organometallic compounds. Another method involves pattern painting where the $\alpha_S/\epsilon_{IR}$ ratio can be varied by adjusting the percent of surface coverage by one coating system with a given set of optical properties over another coating system with vastly different optical properties. These techniques to obtain high $\alpha_S/\epsilon_{IR}$ ratios are limited from the standpoints of ease of application, especially to complex geometrical surfaces, maintenance and repairability, cost, and weight contribution.

The limitations listed in the preceding paragraph could be overcome or alleviated by the development of a suitable coating that could be applied as a paint. Paints containing a binder filled with aluminum powder having an $\alpha_S/\epsilon_{IR}$ ratio of 1.0 to 1.2 have been used for several years for satellite applications. The principal problems associated with metal pigmented paints with respect to obtaining higher $\alpha_S/\epsilon_{IR}$ ratios have been their low $\alpha_S$ values (0.25–0.40) and the fact that the polymeric binders absorb infrared energy, thereby causing high emittance values (0.40+). Comercially available paints containing metal particles other than aluminum, such as copper or bronze, may have high solar absorptance values, but their formulation is such that they do not have the necessary low emittance.

It is an object of this invention, therefore, to provide a paint formulation from which a coating having a high $\alpha_S/\epsilon_{IR}$ ratio can be prepared.

A further object of the invention is to provide a process for forming a coating on a spacecraft or missile surface that has a high $\alpha_S/\epsilon_{IR}$ ratio.

Another object of the invention is to provide low cost surface coatings for missiles and spacecraft that can be readily repaired and maintained.

The present invention resides in a coating formulation from which coatings having high $\alpha_S/\epsilon_{IR}$ ratios can be obtained. Broadly speaking, the formulation comprises a dispersion of oxidized copper flakes in a solution of a polymeric binder. The formulation can be conveniently prepared by dissolving the polymeric binder in a solvent for the binder after which the oxidized copper flakes are added to the solution. Prior to use the solution is stirred to ensure that the flakes are dispersed throughout the solution. A preferred mixing method involves adding the materials to a cylindrical glass container, closing the container with a Teflon cap, and then placing the container on a two-roll roll mill. Rotation of the rolls causes the container to revolve, thereby dispersing the flakes in the solution.

As previously mentioned, the formulation of this invention provides coatings having high $\alpha_S/\epsilon_{IR}$ ratios. In general, the ratios vary from about 1.80 to 2.60 depending upon several factors, including oxidation conditions, method of oxidation, the binder used, and the weight ratio of oxidized copper flakes to binder. In particular, the absorptance values are greatly increased as a result of the use of oxidized flakes whereas the emittance values are only slightly increased. The ability of a spacecraft to meet its design mission is inseparably linked with maintaining the temperature of its contents within the relatively narrow design limits where they operate best. The controlling element which determines the temperature of the vehicle is the ability of its external surface to exchange energy with its environment. The formulation of the present invention with its capability to form coatings having high $\alpha_S/\epsilon_{IR}$ ratio values furnishes an important supplement for accomplishing the required overall temperature balance in spacecraft.

The copper flakes that are oxidized prior to use in preparing the paint formulation are available from commercial sources. They generally vary somewhat in size and are usually irregular in shape. It is preferred to use flakes whose diameter or width is less than 150 microns, preferably in the range of 40 to 100 microns. The thickness of the flakes, of course, also varies, but it is usually in the range of 0.25 to 2.5 microns. The flakes are oxidized by heating them at an elevated temperature in the presence of an oxygen-containing atmosphere, for a time

3810777 sufficient to ensure that an oxide layer is formed on their surfaces. The oxidation is preferably carried out in air at a temperature in the range of about 100 to 300° F. and for a period of about 5 to 60 minutes. In any event the oxidation is continued until the surfaces of the flakes are dark in color.

In general, any of the well-known resins, including those used in the paint art, can be employed as the polymeric binder in preparing the formulation. Examples of suitable binders include phenolic resins, such as phenol-formaldehyde, resorcinol-formaldehyde and phenol-furfural resins; polyorganosiloxanes, such as polymethylsiloxane and polyphenylsiloxane; acrylic resins, such as polyacrylonitrile and polymers of methyl methacrylate; alkyd resins, such as those prepared from phthalic anhydride, maleic anhydride or fumaric acid, and a polyhydric alcohol, such as glycerol, pentaerythritol or sorbitol; nitrocellulose plastics; terephthalate polyesters, such as polyethylene glycol terephthalate; vinyl polymers, such as polyvinyl chloride, polyvinyl acetate, polyvinyl aldehyde, and copolymers of vinyl chloride and vinyl acetate; and the like. It is to be understood that mixtures of resins can be utilized as the polymeric binder.

A number of solvents can be used in preparing the formulation of this invention. The solvent selected will depend upon the particular resin used as the binder, and such a selection is well within the skill of the art. Examples of suitable solvents include aliphatic hydrocarbons, such as pentane, hexane and isooctane; cycloaliphatic hydrocarbons, such as cyclopentane and cyclohexane; aromatic hydrocarbons, such as benzene, toluene and xylenes; alcohols, such as methanol, ethanol and butanol; ketones, such as acetone, methyl ethyl ketone, and methyl isobutyl ketone; acetates, such as vinyl acetate, Cellosolve acetate; and the like.

The amount of each component in the formulation can vary within rather broad ranges. Thus, the formulation can contain on a weight basis 3 to 80 percent oxidized copper flakes, 1 to 20 percent polymeric binder and 19 to 95 percent solvent. To obtain the highest $\alpha_s/\epsilon_{IR}$ ratios, it has been found that the amount by weight of the oxidized copper flakes must be greater than the amount by weight of the binder, preferably from 5 to 8 times greater. However, it is to be understood that good results can be obtained with lower proportions or loadings of the flakes. By using the higher proportions of flake material as compared to the binder, a minimum of the binder in the coating prepared from the formulation is exposed to infrared radiation. As a result the binder is substantially prevented from absorbing infrared energy which would otherwise cause high emittance values. As compared to unoxidized copper flakes, it is possible to obtain much higher loadings with the oxidized flakes. This results in superior film integrity and adhesion for coatings prepared from the formulations of this invention.

The formulation can be applied to the surface or portion of the surface of the spacecraft by brushing or spraying. However, it is preferred to spray the formulation since a more even coating is obtained and locations difficult to reach are more readily coated. Curing of the coating can be accomplished by merely allowing the coated specimen to remain at room temperature for a period of time sufficient for the solvent to evaporate and the coating to harden. The period can vary within rather wide limits, for example, from about 8 to 48 hours and longer. The time necessary to cure the coating can be appreciably shortened by carrying out the procedure at an elevated temperature, for example, from about 50 to 150° C. It is also within the scope of the invention to add a curing agent to the formulation. The particular curing agent used will depend upon the polymeric binder employed in the formulation. For example, organotin compounds, such as tin octoate, can be utilized as curing agents when a polyorganosiloxane is used as the binder. Curing agents suitable for use with the various resins are well known to those skilled in the art. However, compounds containing active hydrogen should not be used as the curing agent since such compounds may reduce the copper oxide. For example, epoxy resins often employ amine curing agents so that such a system should be avoided in the practice of the present invention.

When the formulation is sprayed on the surface or substrate to be coated, the oxidized copper flakes float on top of the thin layer of the solution. As the solvent evaporates, the flakes become embedded in the binder in contiguous relationship with one another, thereby forming a substantially continuous layer of flakes. A very thin film of the polymeric binder covers the flakes.

According to the foregoing description of the preparation of the formulation, the copper flakes are oxidized prior to being dispersed in the binder solution. In another embodiment of the invention, a dispersion of unoxidized copper flakes in a binder solution is prepared. A substrate is then spray coated with the dispersion after which the resulting coating is cured. The coating is then subjected to oxidizing conditions as described hereinbefore with the result that the copper flakes are oxidized while embedded in the cured coating. It has been found that maximum $\alpha_s/\epsilon_{IR}$ ratios are obtained when the coating is prepared in this manner.

A more complete understanding of the invention can be obtained by referring to the following illustrative examples which are not intended, however, to be unduly limitative of the invention.

EXAMPLE I

A series of six coating formulations was prepared by dissolving equal amounts by weight of a polyorganosiloxane and polymethylmethacrylate in toluene. To one of six cylindrical containers containing the solution there was added unoxidized copper flakes while to five of the containers there was added oxidized copper flakes. The flakes had an average size of about 70 microns. The flakes were thoroughly dispersed in the solution by placing the capped containers on a 2-roll roll mill and rotating them for an extended period of time.

The following is the composition of the formulation in each container:

| | Weight percent |
|---|---|
| Binder [1] | 4.2 |
| Copper flakes | 16.7 |
| Toluene | 79.1 |
| | 100.0 |

[1] Blend of 50 wt. percent polyorganosiloxane (General Electric SR82) and 50 wt. percent polymethylmethacrylate (Rohm and Haas B-66).

The copper flakes were oxidized in a forced air oven for a period of 60 minutes at different oxidation temperatures. The formulations were sprayed on aluminum alloy panels and the resulting coatings were then allowed to cure at room temperature. Thereafter, the $\alpha_s$ and $\epsilon_{IR}$ values of the coatings were determined. The oxidation temperatures and the properties of the coatings are shown below in Table I.

TABLE I

| | Oxidation temp., ° F. | $\alpha_s$ | $\epsilon_{IR}$ at 75° F. | $\alpha_s/\epsilon_{IR}$ |
|---|---|---|---|---|
| Coating number: | | | | |
| 1 | Unoxidized | 0.43 | 0.24 | 1.79 |
| 2 | 200 | 0.48 | 0.26 | 1.85 |
| 3 | 225 | 0.55 | 0.29 | 1.89 |
| 4 | 250 | 0.61 | 0.33 | 1.85 |
| 5 | 275 | 0.67 | 0.37 | 1.81 |
| 6 | 300 | 0.67 | 0.39 | 1.72 |

The data in Table I show that the solar absorptance of the coatings is increased when oxidized copper flakes are used in the formulation. Furthermore, by control of oxidation conditions, e.g., at about 225° F, with this particular formulation, it is possible to increase the $\alpha_s/\epsilon_{IR}$ ratio by a substantial amount. As the oxidation temperature is increased the $\alpha_s$ value stabilizes while the $\epsilon_{IR}$ value increases, thereby decreasing the ratio. Thus, merely by controlling the oxidation conditions, it is possible to provide coatings having $\alpha_s/\epsilon_{IR}$ ratios as may be required to obtain the desired temperature distribution of a spacecraft.

EXAMPLE II

Formulations were prepared according to the procedure described in Example I except that nitrocellulose was used as the binder. The composition of the formulations was as follows:

| | Weight percent |
|---|---|
| Binder [1] | 7.7 |
| Copper flakes | 61.6 |
| Lacquer thinner [2] | 30.7 |
| | 100.0 |

[1] Nitrocellulose.
[2] 45 wt. percent amyl acetate, 5 wt. percent Cellosolve acetate, 5 wt. percent toluene, and 45 wt. percent methyl isobutyl ketone.

The copper flakes had an average size of about 70 microns and were oxidized for a period of 20 minutes in a forced air oven. Two coatings were prepared by spraying the formulations on aluminum alloy panels after which the coatings were cured and properties determined as in Example I. The oxidation temperatures and the properties of the coatings are shown below in Table II.

TABLE II

| | Oxidation temp., ° F. | $\alpha_s$ | $\epsilon_{IR}$ at 75° F. | $\alpha_s/\epsilon_{IR}$ |
|---|---|---|---|---|
| Coating number: | | | | |
| 1 | 250 | 0.60 | 0.29 | 2.07 |
| 2 | 300 | 0.59 | 0.29 | 2.03 |

The data in Table II show that coatings with high absorptance and low emittance values with correspondingly high ratios were prepared with nitrocellulose as the binder. The ratio of oxidized copper flakes to binder in these coatings was 8:1 whereas in Example I the ratio was about 4:1. The data demonstrate that the $\alpha_s/\epsilon_{IR}$ ratio can be substantially increased by increasing the loading of oxidized copper flakes, thereby providing another means, in addition to varying oxidation conditions, for controlling the ratio.

EXAMPLE III

Formulations were prepared according to the procedure of Example I in which unoxidized copper flakes were used. The following are the compositions of the formulations:

| | Weight percent | | |
|---|---|---|---|
| | A | B | C |
| Binder | [1] 1.4 | [1] 7.1 | [2] 3.6 |
| Copper flakes | 42.8 | 28.6 | 5.6 |
| Solvent | [3] 55.8 | [3] 64.3 | [4] 90.8 |
| Total | 100.0 | 100.0 | 100.0 |

[1] See footnote 1 to formulation of Example I.
[2] Nitrocellulose.
[3] Xylene.
[4] See footnote 2 to formulation of Example II.

The formulations were sprayed on aluminum alloy panels and thereafter cured at room temperature. The cured coatings were then oxidized in a forced air oven for 20 minutes. The oxidation temperatures and the properties of the coatings before and after oxidation are shown below in Table III.

TABLE III

| Coating No. and formulation | $\alpha_s$ before oxidation | $\epsilon_{IR}$ (75° F.) before oxidation | Oxidizing temperature, ° F. | $\alpha_s$ after oxidation | $\epsilon_{IR}$ (75° F.) after oxidation | $\alpha_s/\epsilon_{IR}$ after oxidation |
|---|---|---|---|---|---|---|
| 1-A | 0.43 | 0.22 | 250 | 0.59 | 0.24 | 2.46 |
| 2-B | 0.43 | 0.20 | 200 | 0.54 | 0.22 | 2.45 |
| 3-B | 0.43 | 0.20 | 250 | 0.62 | 0.24 | 2.59 |
| 4-C | 0.41 | 0.25 | 250 | 0.57 | 0.22 | 2.59 |

The foregoing data show that by oxidizing the coatings containing unoxidized copper, the absorptance values are greatly increased with little change in emittance values. As a result very high ratios are obtained.

In the foregoing examples, solar absorptance ($\alpha_s$) was determined by the use of a dual beam spectrophotometer with an absolute deflectance integrating sphere using a xenon energy source throughout the wavelength range. Calculation of the $\alpha_s$ of each coating involves a procedure of averaging the percent reflectance and 100% line values over a wavelength increment, then multiplying the reflectance by the percent solar intensity corresponding to this wavelength increment as defined by F. S. Johnson, "Satellite Environment Handbook," Stanford Press (1961). These values of reflected energy are summed up for each increment (a total of 25 points are used) to obtain the integrated solar reflectance, which is subtracted from 100% to obtain the solar absorptance. Magnesium oxide is used as the integrating sphere coating, but because of the sphere geometry and the dual beam of the spectrophotometer, an absolute reflectance value is obtained.

The total normal spectral emittance is calculated from 3 to 25 microns spectral reflectance data from a double beam spectrophotometer equipped with a hohlraum heated cavity. The reflectance values are corrected for both the zero and 100% datum lines. The 100% datum line is obtained using nickel oxide as the reference. The total emittance value of a given sample is calculated from the reflectance measurements and compared to a theoretical black body at a 75° F. surface temperature.

As will be evident to those skilled in the art, various modifications of this invention can be made or followed in the light of the foregoing disclosure and discussion without departing from the spirit or scope of the invention.

We claim:

1. A process for controlling the thermal balance of missile and spacecraft structures which comprises:
   (a) oxidizing copper flakes by heating same in an oxygen-containing atmosphere at a temperature in the range of about 100 to 300° F. for a period of about 5 to 60 minutes;
   (b) dispersing the oxidized copper flakes in a solution of a curable polymeric binder in a solvent therefor so as to obtain a formulation, on a weight basis, consisting of 1 to 20 percent binder, 19 to 95 percent solvent, and 3 to 80 percent oxidized copper flakes, the amount by weight of the flakes being greater than the amount by weight of the binder;
   (c) applying a coating of the formulation of (b) to a surface of said missile or spacecraft;
   (d) evaporating the solvent from the coated structures; and
   (e) curing the polymeric binder with the oxidized copper flakes embedded therein to provide on the surface of said structures a coating having a solar absorptance to infrared emittance ratio ranging from 1.80 to 2.60.

2. The process according to claim 1 in which the amount by weight of the oxidized copper flakes is greater than the amount by weight of the binder by from 5 to 8 times.

3. The process according to claim 1 in which the polymeric binder is selected from the group consisting of phenolic resins, polyorganosiloxanes, acrylic resins, alkyd resins, nitrocellulose plastics, terephthalate polyesters, and vinyl polymers; and the solvent is selected from the group consisting of hydrocarbons, alcohols, ketones and organic acetates.

References Cited

UNITED STATES PATENTS

| | | | |
|---|---|---|---|
| 3,653,942 | 4/1972 | Boebel et al. | 117—33.3 |
| 2,592,655 | 4/1952 | Carlston et al. | 260—27 |
| 2,514,868 | 7/1950 | Hubbell | 260—738 |
| 2,274,766 | 3/1942 | Ziehl | 106—290 |
| 2,666,714 | 1/1954 | Halberstadt | 106—290 |
| 3,532,528 | 10/1970 | Bradshaw | 106—290 |

OTHER REFERENCES

Chemical Abstracts, vol. 57:6057d, September 1962, "Selective Radiation Coatings for Solar Heating."

Chemical Abstracts, vol. 57:6058e, September 1972, "Selective Radioactive Coatings of Cupric Oxide.

WILLIAM D. MARTIN, Primary Examiner

W. H. SCHMIDT, Assistant Examiner

U.S. Cl. X.R.

117—132 B, 132 BE, 132 BS, 132 BF, 137; 244—1 SC; 350—1